US005999631A

United States Patent [19]

Porayath et al.

[11] Patent Number: 5,999,631

[45] Date of Patent: Dec. 7, 1999

[54] ACOUSTIC FEEDBACK ELIMINATION USING ADAPTIVE NOTCH FILTER ALGORITHM

[75] Inventors: Rajiv Porayath; Daniel J. Mapes-Riordan, both of Evanston, Ill.

[73] Assignee: Shure Brothers Incorporated, Evanston, Ill.

[21] Appl. No.: 08/687,682

[22] Filed: Jul. 26, 1996

[51] Int. Cl.[6] .......... H04B 15/00

[52] U.S. Cl. .......... 381/93; 381/83

[58] Field of Search .......... 381/83, 93, 94, 381/95, 96, 68.2, 68.4, 94.1, 94.2, 94.3, 317, 318; 364/724.19; 379/406, 410

[56] References Cited

U.S. PATENT DOCUMENTS

| | | | |
|---|---|---|---|
| 4,232,192 | 11/1980 | Beex | 381/98 |
| 4,905,290 | 2/1990 | Yaoita | 381/83 |
| 5,245,665 | 9/1993 | Lewis et al. | 381/93 |
| 5,442,712 | 8/1995 | Kawamura et al. | 381/93 |
| 5,506,910 | 4/1996 | Miller et al. | 381/103 |
| 5,533,120 | 7/1996 | Staudacher | 381/103 |

*Primary Examiner*—Ping W Lee
*Attorney, Agent, or Firm*—Banner & Witcoff Ltd.

[57] ABSTRACT

Techniques for reducing unwanted acoustic feedback in a space are carried out by an adaptive notch filter algorithm that adjusts a notch to a plurality of different notch values in order to locate feedback. The results obtained by performing the algorithm at various notch values are compared. Based on the comparison, the parameters for the algorithm are adjusted for processing of the input signals to reduce the feedback.

22 Claims, 4 Drawing Sheets

ACOUSTIC FEEDBACK ELIMINATION USING ADAPTIVE NOTCH FILTER ALGORITHM

BACKGROUND OF THE INVENTION

1. Field of the Invention

This invention relates to techniques for reducing acoustic feedback, and more particularly relates to such techniques in which a digital notch filter algorithm is employed.

2. Description of Related Art

Digital notch filters have been used in the past in an attempt to reduce acoustic feedback in sound amplification systems, including public address systems. For example, U.S. Pat. No. 4,091,236 (Chen, issued May 23, 1978) describes an analog notch filter for an audio signal to suppress acoustical feedback. The apparatus receives an audio signal which is substantially non-periodic in the absence of acoustical feedback and substantially periodic with an instantaneous dominant frequency in the presence of such feedback. The duration of successive periods are monitored and compared by an up/down counter to determine whether the audio input signal is substantially periodic and to determine the instantaneous dominant frequency of the audio signal. Upon detection of an audio signal which is substantially periodic, the notch filter is tuned to the instantaneous dominant frequency so as to suppress the acoustical feedback.

U.S. Pat. No. 4,232,192 (Beex, issued Nov. 4, 1980) describes an integrator/detector (FIG. 9) which determines when an audio signal has exceeded a threshold for a selected number of cycles. If the threshold is exceeded for the selected number of cycles, a sampler circuit samples a voltage corresponding to the frequency that has exceeded the threshold. The sampled voltage is used by a voltage frequency converter in order to adjust the notch of a notch filter implemented in hardware.

U.S. Pat. No. 5,245,665 (Lewis et al., issued Sep. 14, 1993) describes a device for suppressing feedback in which a Fast Fourier Transform is conducted on samples of digitized signals to produce corresponding frequency spectrums. The magnitudes of the spectrum at various frequencies are analyzed to determine one or more peak frequencies which are 33 decibels greater than harmonics or sub-harmonics of the frequency in an attempt to detect resonating feedback frequencies. Two processors are required. A primary processor periodically collects a series of the passing digital signals and conducts a Fast Fourier Transform on each collected series of digital signals. The frequency spectrums produced by the Fast Fourier Transform are examined by the primary processor to discover the presence of any resonating feedback frequency. Filter control signals are passed by the primary processor, along with the digital sound signals, to a secondary processor which operates a digital filtering algorithm in accordance with the filter control signals to attenuate resonating feedback frequencies in the stream of digital signals.

SUMMARY OF THE INVENTION

The present invention can be used to increase the effective acoustic gain before acoustic feedback in public address systems, hearing aids, teleconferencing systems, hands-free communication interfaces, and the like. The invention uses techniques unrelated to the notch filters employed by the known prior art, including the above-discussed patents. Rather than attempting to identify a frequency at which feedback is occurring, the present invention employs an algorithm defining a digital filter with a notch adjustable to a plurality of notch values expressed in non-frequency terms, such as phase angles. Feedback is located by comparing values resulting from the processing with the notch adjusted to different notch values.

One novel feature of the invention is that notch filter coefficients are generated directly by the feedback detector. This eliminates the step of identifying the frequency of feedback prior to generating the notch filter coefficients.

According to one embodiment of the invention, the notch values are adjusted until the signals processed by the notch filter algorithm result in a minimum mean squared value over a time window. After the feedback has been located using the notch filter algorithm, digital output signals are generated by executing the algorithm with the notch adjusted to the notch value at which the minimum mean squared value results. The digital output signals then are converted to corresponding analog signals which are transmitted to a speaker.

By using the foregoing techniques, acoustic feedback can be reduced with a degree of efficiency and accuracy previously unattainable. By eliminating the need to determine the frequency at which feedback is occurring, the technique can be carried out by a single inexpensive microprocessor. In addition, the feedback can be located with a high degree of accuracy, thereby reducing the filter depth required to ensure system stability, increasing the resulting quality of the sound produced by the overall system.

BRIEF DESCRIPTION OF THE DRAWINGS

These and other advantages and features of the invention will become apparent upon reading the followed detailed description and referring to the accompanying drawings in which like numbers refer to like parts throughout and in which.

DESCRIPTION OF THE PREFERRED EMBODIMENTS

Figure 1:
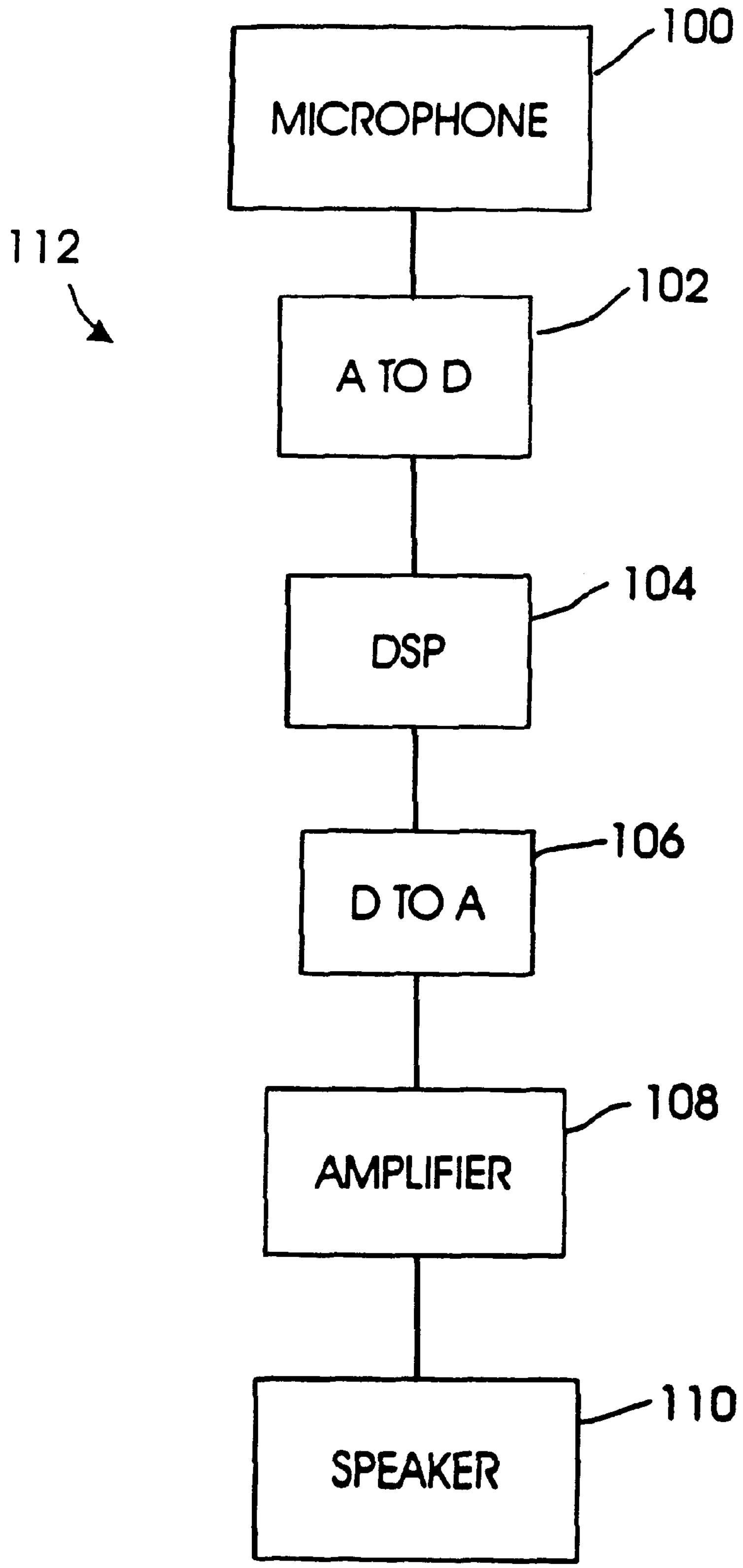
FIG. 1 is a block diagram illustrating a preferred form of components for use in connection with the present invention.

Referring to FIG. 1, a preferred form of the invention includes a conventional microphone 100 that generates audio signals which are sampled every 21 microseconds by a conventional analog to digital converter 102. The digital signals produced by converter 102 are received by a conventional digital signal processor 104 and are processed according to the algorithms described in connection with FIGS. 2–4. Processor 104 outputs digital signals resulting from the algorithms to a conventional digital to analog converter 106 which supplies audio signals to a conventional amplifier 108 that drives a speaker 110. All of the components illustrated in FIG. 1 are included within a space 112 which may be a room, an ear canal in which a hearing aid is mounted, and the like.

Figure 2:
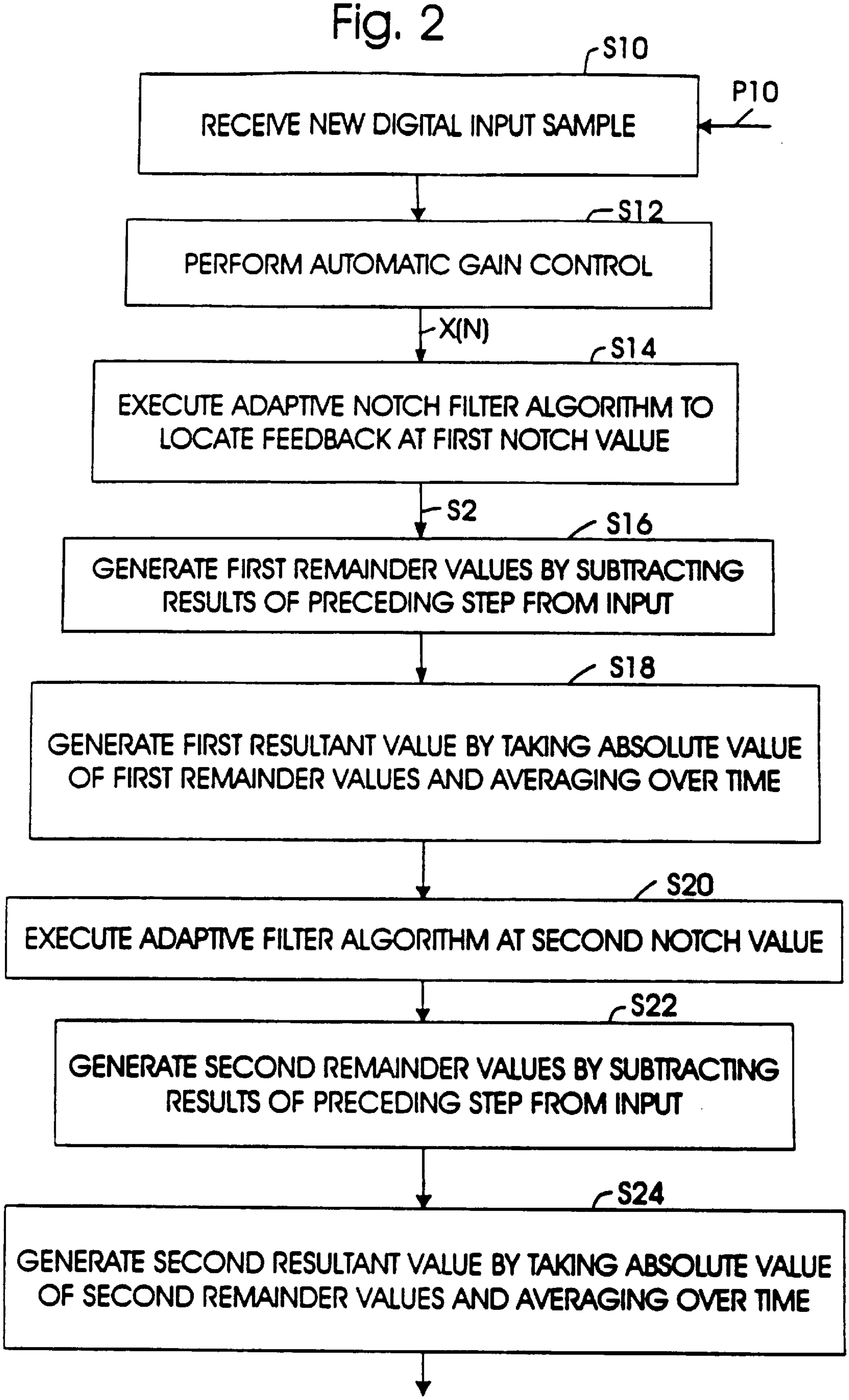
FIGS. 2 and 3 are flow diagrams illustrating a preferred form of algorithm executed by the digital signal processor shown in FIG. 1.

Referring to FIG. 2, processor 104 receives a new digital input sample from converter 102 every 21 microseconds as shown in step S10. In step S12, the processor performs an automatic gain control function that includes a digital peak detector with a rapid attack and slow decay. The peak detector creates a control signal which keeps the value of the signals from converter 102 normalized to the digital clipping level. This feature maintains a maximum undistorted signal for processing by an adaptive filter algorithm even in the presence of weak feedback signals.

Figure 4:
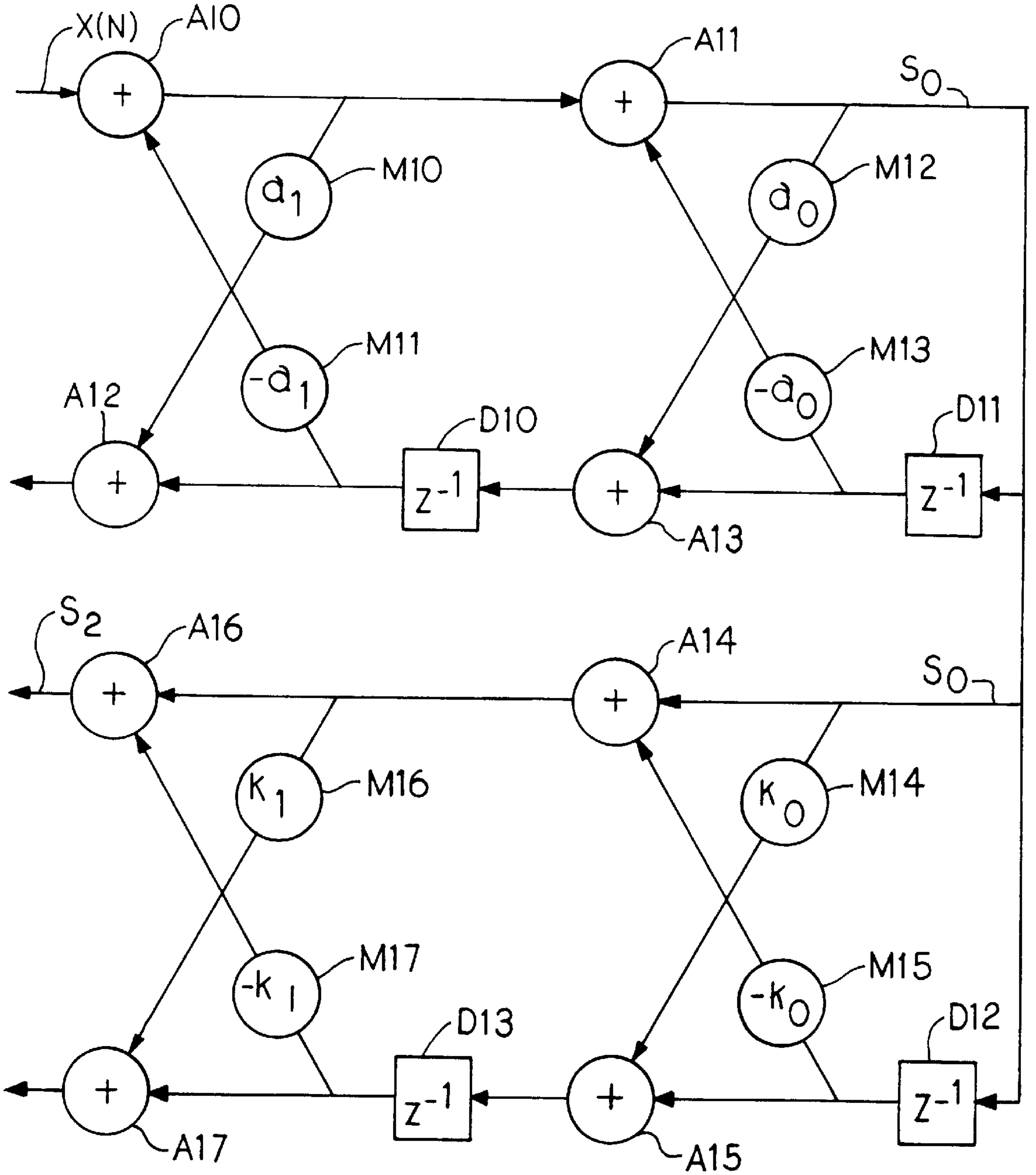
FIG. 4 is a flow diagram illustrating a preferred form of digital notch filter algorithm performed by the processor shown in FIG. 1.

The input sample values resulting from automatic gain control in step S12 (i.e., values x(n)) are operated on by an adaptive notch filter algorithm in step S14. FIG. 4 illustrates the adaptive notch filter algorithm in conventional filter notation. The algorithm includes addition terms A10–A17, multiplication terms M10–M17, and one clock cycle delays represented by D10–D13. During each clock cycle, a new value of $k_0$ is calculated and substituted in multiplication terms M14–M15. The value of $k_1$ is fixed at 1. In FIG. 4, $a_0=k_0$, $a_1=(k_1)$, therefore $a_1=$ .

The notch filter algorithm adapts parameter $k_0$ until the presence of feedback, if any, is detected. A value of k is calculated according to the following equation:

$$k = \frac{-C(n+1)}{D(n+1)},$$

from which is calculated $k_0(n)$ where $$k_0(n)=0.5k_0(n-1)+0.5k,$$

$$C(n+1)=\lambda C(n)+A(n+1)B(n+1),$$

$$D(n+1)=\lambda D(n)+A(n+1)A(n+1),$$

$$A(n+1)=2^*s_0(n),$$

$$B(n+1)=s_0(n+1)+s_0(n-1),$$

and $$s_0(n+1)=x(n+1)-k_0(n)(1+\ )s_0(n)-\ s_0(n-1),$$

where is a parameter which preferably ranges in value from 0.99 to 0.999 and corresponds to the phase angle band width of the notch filter which preferably varies from 0.0375 to 0.075 degrees.

In step S14, the value of $k_0$ converges on a first value at which the values resulting from the notch filter algorithm described in FIG. 4 represent a minimum mean squared value over a time window. The time window is determined by the value of $\lambda$ which is set to a value less than one, such as 0.9. Stated differently, the value of parameter $k_0$ converges on a first notch value at which the value of $s_2^2$ is minimized over a time period determined by the value of $\lambda$ which preferably lies within the range 0.9 to 0.05.

The algorithm illustrated in FIG. 4 results in a value $s_2$ at the end of step S14.

In step S16, value $s_2$ is used to generate first remainder values by subtracting the values of $s_2$ from the input values x(n). In step S18, a first resultant value is calculated by taking the absolute value of the first remainder values and averaging them over time. Averaging is achieved by calculating the average of the absolute value signals using the following equation:

$$z(n)=\text{beta}^*y(n)+(1-\text{beta})^*y(n-1)+(1-\text{beta})^{2*}y(n-2)+\ldots+(1-\text{beta})^{10*}y(n-10)+\ldots$$

The term beta determines the averaging ratio, viz. the most recent sample is multiplied by the value of beta and the previous value of the average output is multiplied by a term (1−beta). This is the same concept as multiplying older values of y by a smaller term. Values of beta are chosen for optimum performance and determine the value to which z would average to for a given signal input.

In step S20, the value of $k_0$ for the algorithm illustrated in FIG. 4 is set to the relationship $-2k_0^2+1$, where the value of $k_0$ is the value obtained in step S14. If $k_0$ is represented by the −cos x, then the new second value of $k_0$ is set equal to cos 2x. With the new second value of $k_0$, the algorithm illustrated in FIG. 4 is again executed and the resulting output value $s_2$ is subtracted from the input x(n) in step S22 to create second remainder values. In step S24, a second resultant value is calculated by taking the absolute value of the second remainder values and averaging them over time as in step S18.

Figure 3:
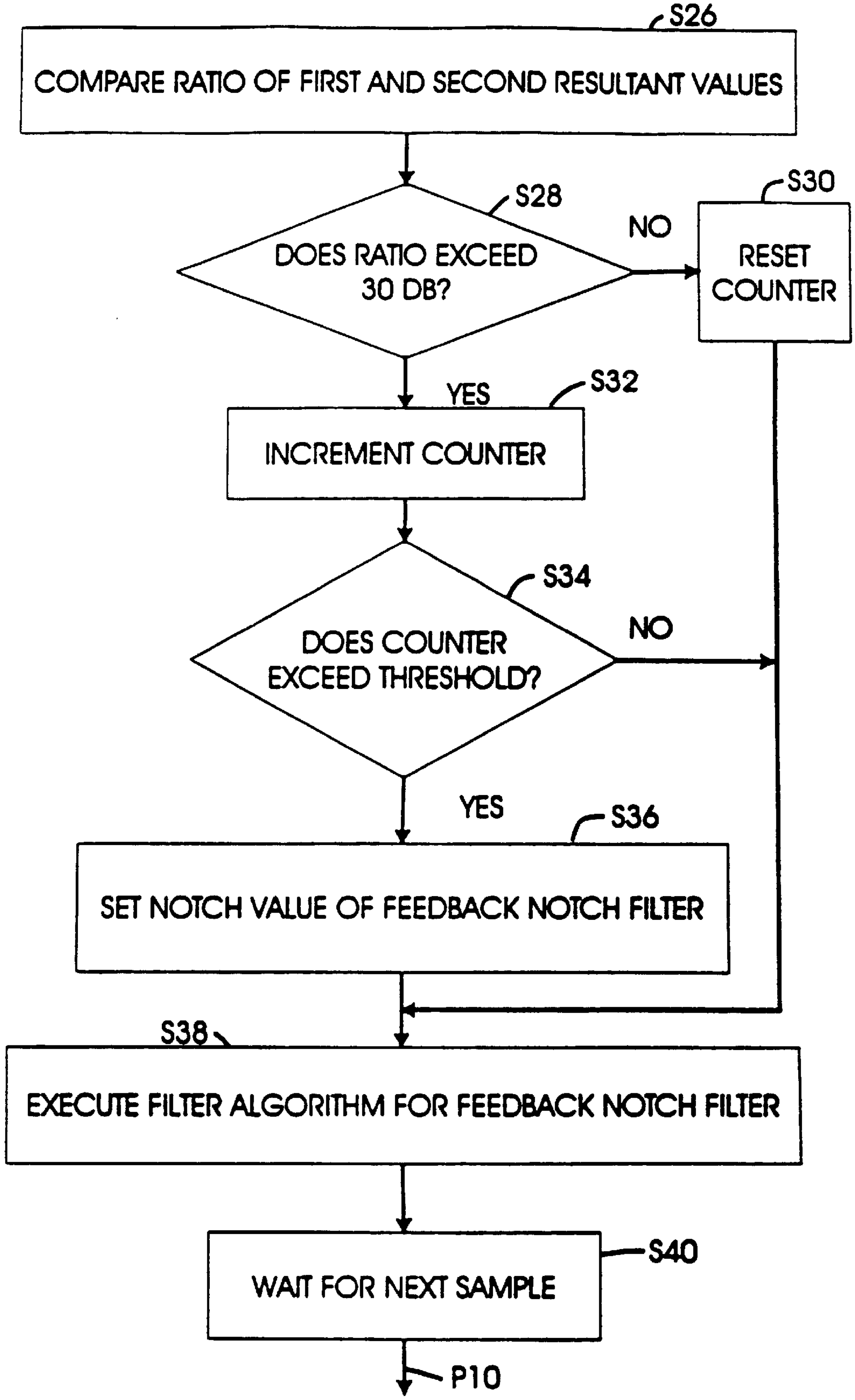

Referring to FIG. 3, in step S26, the ratio of the first and second resultant values obtained in steps S18 and S24 are calculated. In step S28, if the ratio exceeds 30 decibels, a software counter is incremented in step S32. If the ratio does not exceed 30 decibels, then the software counter is reset in step S30. In steps S34 and S36, the algorithm determines whether the software counter exceeds a predetermined threshold count. The count corresponds to a time period preferably lying in the range of 50 to 100 milliseconds. If the count is exceeded, then the notch value $k_0$ of the filter algorithm shown in FIG. 4 is set to the same value obtained in step S14. In step S38, the filter algorithm shown in FIG. 4 is executed with the value of $k_0$ obtained from step S14. Step S38 results in a substantial decrease in the magnitude of the feedback signal detected in steps S10–S34. Step S38 is executed as many times as necessary with $k_0$ set to different values corresponding to feedback detected in steps S10–S34 at different values of $k_0$.

The output digital signals resulting from step S38 are sent to digital to analog converter 106 (FIG. 1). In step S40, the algorithm waits for the next sample and returns via path P10 to step S10 (FIG. 2) in order to execute another cycle of the algorithm.

Those skilled in the art will recognize that the preferred embodiments may be altered and amended without departing from the true spirit and scope of the invention as defined in the accompanying claims.

We claim:

1. A method of reducing unwanted acoustic feedback in a space including a microphone for generating audio signals and a speaker for transducing said audio signals to sound waves, said method comprising in combination the steps of:

- converting said audio signals to corresponding digital input signals;
- processing said input signals by an algorithm defining an adaptive digital filter with a notch adjustable to a plurality of notch values;
- detecting said feedback by comparing resultant values resulting from said processing with said notch adjusted to different ones of said notch values;
- generating digital output signals by executing said algorithm with said notch adjusted to one of said notch values used during said step of detecting;
- converting said digital output signals to corresponding output analog signals;
- transmitting said output analog signals to said speaker; wherein said step of detecting comprising
  - adjusting said notch values until said processing results in a predetermined calculated value obtained at a first one of said notch values;

setting said notch to a second notch value having a predetermined relationship to said first notch value;

performing said algorithm with said notch set at said second notch value; and generating a first one of said resultant values in response to said processing at said first notch value;

generating a second one of said resultant values in response to said processing at said second notch value;

comparing said first and second resultant values; and setting said notch at said first notch value in the event said first and second resultant values have a predetermined ratio over a predetermined time period.

2. A method, as claimed in claim 1, wherein said time period is more than 50 milliseconds.

3. A method, as claimed in claim 1, wherein said notch includes a first group of angles.

4. A method, as claimed in claim 1, wherein said notch value defines a phase angle of said notch and wherein said predetermined relationship is such that a phase angle defining said second notch value is an integer multiple of said phase angle defining said first notch value.

5. A method, as claimed in claim 1, wherein said calculated value corresponds to a minimum value.

6. A method, as claimed in claim 5, wherein said calculated value is a minimum mean squared value over a time window resulting from said step of processing.

7. A method, as claimed in claim 1, wherein said step of generating a first one of said resultant values comprises the steps of generating first remainder values by subtracting the values of said digital input signals from the values of the signals resulting from said step of processing at said first notch value, generating first absolute value signals by calculating the absolute value of said first remainder values, and averaging said first absolute value signals; and wherein said step of generating a second one of said resultant values comprises the steps of generating second remainder values by subtracting the values of said digital input signals from the values of the signals resulting from said step of processing at said second notch value, generating second absolute value signals by calculating the absolute value of said second remainder values, and averaging sad second absolute value signals.

8. A method, as claimed in claim 7, wherein said calculated value is a minimum mean squared value over a time window resulting from said step of processing.

9. A method, as claimed in claim 1, wherein said step of generating a first one of said resultant values comprises the steps of generating first remainder values by subtracting the values of said digital input signals from the values of the signals resulting from said step of processing at said first notch value, generating first absolute value signals by calculating the absolute value of said first remainder values, and averaging said first absolute value signals; and wherein said step of generating a second one of said resultant values comprises the steps of generating second remainder values by subtracting the values of said digital input signals from the values of the signals resulting from said step of processing at said second notch value, generating second absolute value signals by calculating the absolute value of said second remainder values, and averaging said second absolute value signals.

10. Apparatus for reducing unwanted acoustic feedback in a space including a microphone for generating audio signals and a speaker for transducing said audio signals to sound waves, said apparatus comprising in combination:

means for converting said audio signals to corresponding digital input signals;

means for processing said input signals by an algorithm defining an adaptive digital filter with a notch adjustable to a plurality of notch values, for detecting said feedback by comparing resultant values resulting from said processing with said notch adjusted to different ones of said notch values, and for generating digital output signals by executing said algorithm with said notch adjusted to one of said notch values used during said detecting;

means for converting said digital output signals to corresponding output analog signals;

means for transmitting said output analog signals to said speaker; wherein said means for processing comprising means for adjusting said notch values until said processing results in a predetermined calculated value obtained at a first one of said notch values, for setting said notch to a second notch value having a predetermined relationship to said first notch value, for performing said algorithm with said notch set at said second notch value, for generating a first one of said resultant values in response to said processing at said first notch value, for generating a second one of said resultant values in response to said processing at said second notch value, for comparing said first and second resultant values, and for setting said notch at said first notch value in the event said first and second resultant values have a predetermined ratio over a predetermined time period.

11. Apparatus, as claimed in claim 10, wherein said predetermined ratio is 30 decibels or more.

12. Apparatus, as claimed in claim 11, wherein said time period is more than 50 milliseconds.

13. Apparatus, as claimed in claim 12, wherein said means for processing comprises a single microprocessor.

14. Apparatus, as claimed in claim 12, wherein said means for processing, detecting and generating includes means for generating notch filter coefficients directly from the feedback detecting means without having to identify the feedback frequency.

15. Apparatus, as claimed in claim 10, wherein said notch value defines a phase angle of said notch and wherein said predetermined relationship is such that a phase angle defining said second notch value is an integer multiple of said phase angle defining said first notch value.

16. Apparatus, as claimed in claim 10, wherein said predetermined relationship between said first notch value and said second notch value is cos x and cos 2x, respectively.

17. Apparatus, as claimed in claim 10, wherein said calculated value corresponds to a minimum value.

18. Apparatus, as claimed in claim 10, wherein said means for processing comprises means for generating first remainder values by subtracting the values of said digital input signals from the values of the signals resulting from said step of processing at said first notch value, for generating first absolute value signals by calculating the absolute value of said first subtracted values, for averaging said first absolute value signals, for generating second remainder values by subtracting the values of said digital input signals from the values of the signals resulting from said step of processing at said second notch value, for generating second absolute value signals by calculating the absolute value of said second subtracted values, and for averaging said second absolute value signals.

19. Apparatus, as claimed in claim 10, wherein said means for processing comprises a single microprocessor.

20. Apparatus, as claimed in claim 10, wherein said means for processing, detecting and generating includes means for generating notch filter coefficients directly from the feedback detector without having to identify the feedback frequency.

21. Apparatus, as claimed in claim 20, wherein said calculated value is a minimum mean squared value over a time window resulting from said step of processing.

22. Apparatus, as claimed in claim 10, wherein said means for processing comprises means for generating first remainder values by subtracting the values of said digital input signals from the values of the signals resulting from said step of processing at said first notch value, for generating first absolute value signals by calculating the absolute value of said first remainder values, for averaging said first absolute value signals, for generating second remainder values by subtracting the values of said digital input signals from the values of the signals resulting from said step of processing at said second notch value, for generating second absolute value signals by calculating the absolute value of said second remainder values, and for averaging said second absolute value signals.

* * * * *